United States Patent
Guzowski

[11] Patent Number: 6,105,972
[45] Date of Patent: *Aug. 22, 2000

[54] PIPE GASKET WITH IMPROVED LOW INSERTION GEOMETRY

[75] Inventor: Samuel Guzowski, Appartado, Costa Rica

[73] Assignee: S & B Technical Products, Inc., Fort Worth, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/005,911

[22] Filed: Jan. 12, 1998

[51] Int. Cl.$^7$ .................................................. F16J 15/10
[52] U.S. Cl. ........................ 277/604; 277/608; 277/626; 277/651
[58] Field of Search ................................ 277/604, 608, 277/612, 626, 644, 648, 651; 285/231, 232, 374

[56] References Cited

U.S. PATENT DOCUMENTS

| | | |
|---|---|---|
| 2,294,142 | 8/1942 | Turner . |
| 3,020,054 | 2/1962 | Driancourt . |
| 3,179,446 | 4/1965 | Paterson . |
| 3,576,329 | 4/1971 | Weaver . |
| 3,620,556 | 11/1971 | Paddington et al. . |
| 4,030,872 | 6/1977 | Parmann ............................ 425/393 |
| 4,572,523 | 2/1986 | Guettouche et al. . |
| 4,768,278 | 9/1988 | Pickering et al. . |
| 4,818,209 | 4/1989 | Petersson et al. . |
| 4,856,561 | 8/1989 | Zicaro . |
| 4,984,831 | 1/1991 | Bengtsson . |
| 5,213,339 | 5/1993 | Walworth . |

OTHER PUBLICATIONS

A/S Inventor, The Rieber Sealing System For PCV Pipes Brochure.

*Primary Examiner*—Anthony Knight
*Assistant Examiner*—John L. Beres
*Attorney, Agent, or Firm*—Charles D. Gunter, Jr.

[57] ABSTRACT

A pipe sealing gasket is shown which is designed to be received within a groove provided within a socket end of a thermoplastic pipe. The gasket includes a ring shaped body which, when viewed in cross-section includes a leading nose region and a lower compression region. The leading nose region is joined to the lower compression region by a leading curved surface region which defines an angle α with respect to a horizontal axis drawn parallel to the central axis of the pipe. The lower compression region is joined to a secondary seal surface by a trailing curved surface region which defines a second angle β with respect to the horizontal axis drawn parallel to the central axis of the pipe. The angles α and β are selected to minimize the insertion force required when inserting the male spigot end within the female socket end of the pipe joint while guiding the spigot end and maintaining a compression seal between the pipe sections.

12 Claims, 5 Drawing Sheets

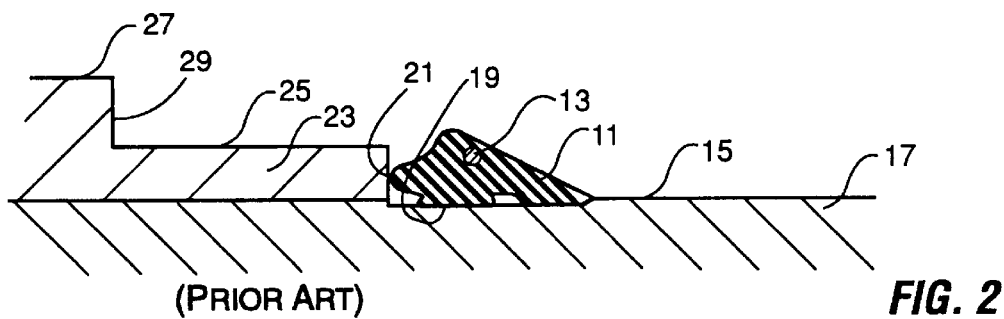
(PRIOR ART)     FIG. 2
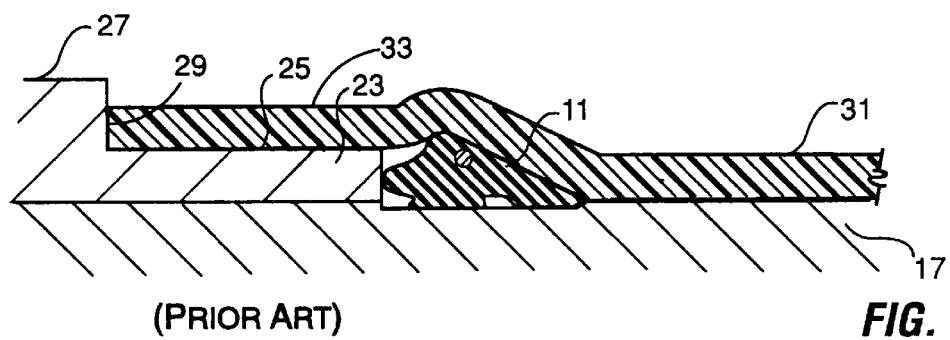
(PRIOR ART)     FIG. 3
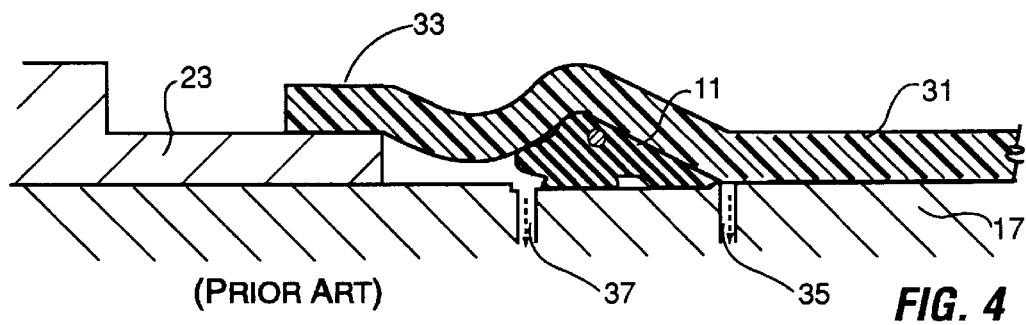
(PRIOR ART)     FIG. 4
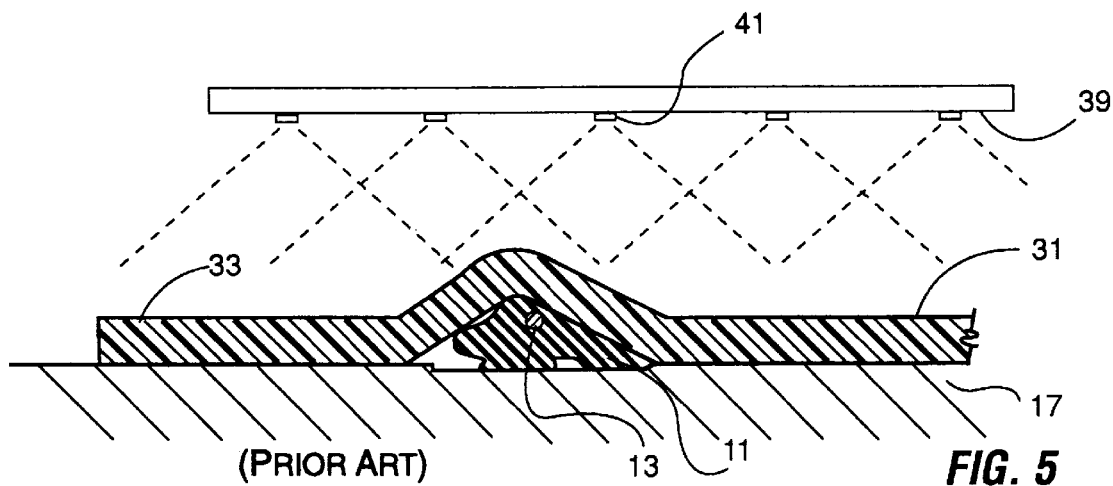
(PRIOR ART)     FIG. 5

PIPE GASKET WITH IMPROVED LOW INSERTION GEOMETRY

BACKGROUND OF THE INVENTION

1. Field of the Invention

The present invention relates generally to sealing gaskets used for pipe joints in which a male spigot pipe section is installed within a mating female socket pipe section.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

Certain of the prior art techniques have involved the use of gaskets which formed "lip" seals, those seals having a lip portion which was deformed by folding back as the male pipe section was inserted within the female pipe section. Lip seals generally rely upon the internal pipe pressure to provide a sealing effect. In some conditions, these type joints are less than desirable since the lip seal can peel away, allowing leakage through the joint. Particularly, under pulsating pressure conditions, lip seals can provide less than satisfactory results. A sudden decrease in internal pipe pressure can result in contamination of the sealing area and of the pipe interior.

One early attempt to ensure the integrity of pipe joints used under demanding conditions was to provide local reinforcement of the groove portion of the female socket end by means of a heavier wall thickness in this region of the pipe. In some cases, reinforcing sleeves were also utilized. Each of these solutions was less than ideal, in some cases failing to provide the needed joint integrity and often contributing to the complexity and expense of the manufacturing operation.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

The Rieber system, with its integrally installed gasket provided a compression seal geometry, rather than relying upon the lip seal systems of the prior art. As the female socket end of the pipe cooled around the previously installed gasket, the elastomeric body of the gasket was compressed between a steel reinforcing ring and the groove formed in the socket end of the pipe. When the mating spigot was installed to make up a pipe joint, further compression of the gasket occurred in a radial direction along an internal compression region of the gasket.

Despite the advances offered by the Rieber process, the compression seal geometry presented problems in certain field applications. In some applications, particularly involving larger diameter pipe, the insertion force needed to install the male spigot end within the mating socket end required a high insertion force which could, on some occasions, cause the gasket to be distorted or displaced.

The present invention has, as one object, to provide a pipe gasket for use in such systems which offers an improved compression seal geometry.

Another object of the invention is to provide such a pipe gasket which provides a minimally interfering trajectory and consequent lower insertion force for the male, spigot end when entering the female, spigot end to facilitate assembly of the pipe joint in the field.

Another object of the invention is to provide a sealing system of the above type in which a sealing gasket is installed within a groove provided within a female, socket end of a thermoplastic pipe in which the gasket is designed with an improved insertion geometry to provide a lower insertion force while maintaining a proper compression seal with respect to a mating male spigot end of pipe.

SUMMARY OF THE INVENTION

A pipe sealing gasket is shown which is designed for receipt within a groove provided within a socket end of a thermoplastic pipe. The gasket includes a ring shaped elastomeric body which, when viewed in cross-section, includes a leading nose region and a lower compression region. The leading nose region is joined to the lower compression region by a leading curved surface region which defines an angle $\alpha$ with respect to a horizontal axis drawn parallel to a central axis of the pipe. The lower compression region is joined to a secondary seal surface by a trailing curved surface region which defines a second angle $\beta$ with respect to the horizontal axis drawn parallel to the central axis of the pipe. The angles $\alpha$ and $\beta$ are selected to minimize the insertion force required when inserting the male spigot end within the female socket end while maintaining a compression seal between the pipe sections making up the joint.

The proper selection of the angles $\alpha$ and $\beta$ and, particularly, of the angle $\alpha$ provides several advantages over the prior art. The insertion force which is required during joint assembly is reduced. The improved geometry also provides a self-centering effect for the spigot end of the pipe during insertion. The design of the sealing gasket of the invention also allows the insertion of unchamfered spigots (field cuts) without damaging the gasket or interfering with the integrity of the pipe joint.

Additional objects, features and advantages will be apparent in the written description which follows.

BRIEF DESCRIPTION OF THE DRAWINGS

FIGS. 2–5 are simplified, schematic illustrations of the prior art Rieber process for installing a compression, seal gasket within a groove formed within the female socket end of a thermoplastic pipe;

DETAILED DESCRIPTION OF THE INVENTION

The advantages provided by the pipe gasket having the improved compression seal geometry of the invention can best be understood with reference to the prior art gaskets provided by the Rieber process. Turning first to FIGS. 2–5, the Rieber process is illustrated showing the installation of a prior art compression seal gasket within the groove provided within the socket end of the female pipe section.

Figure 1:
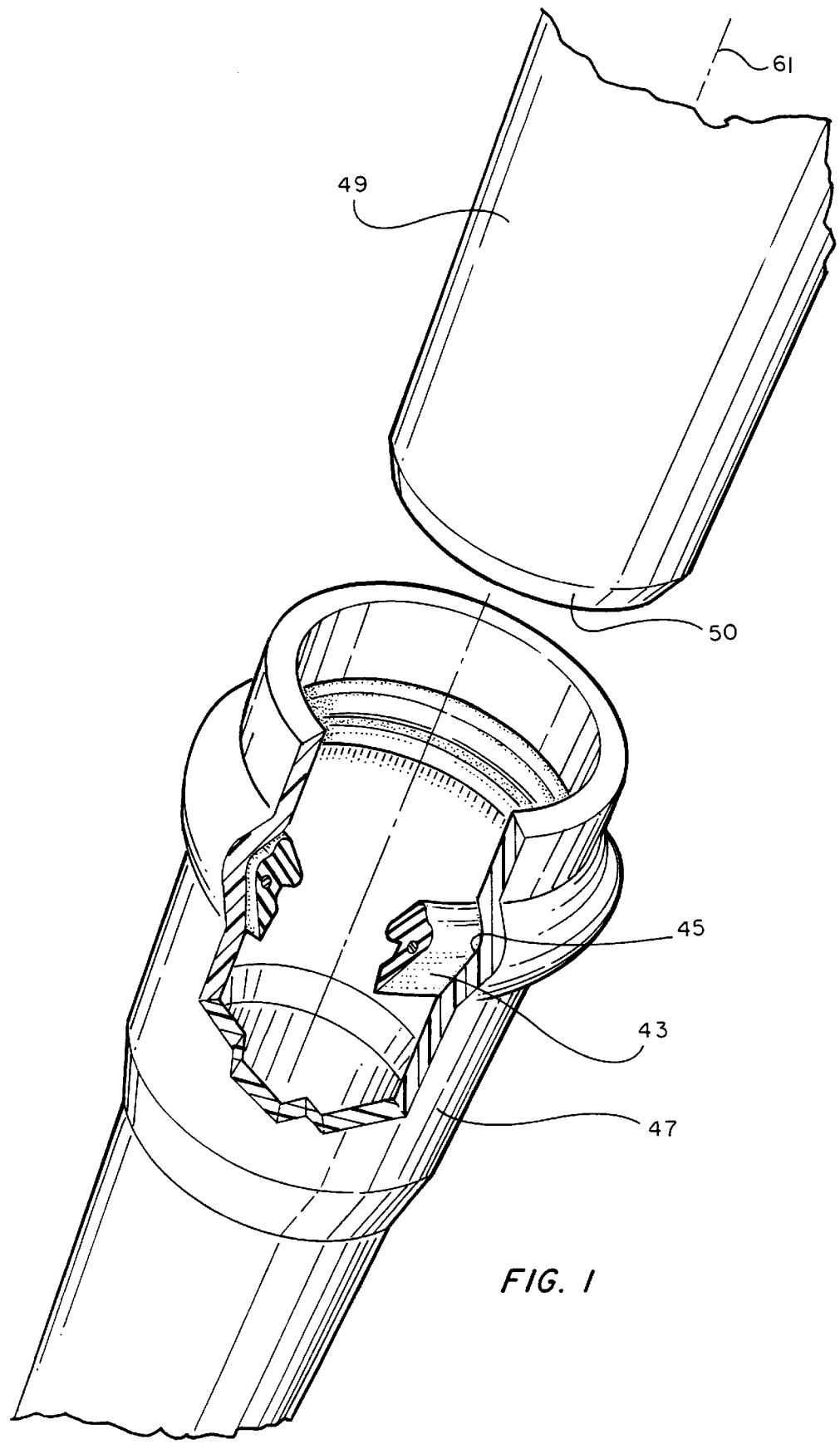
FIG. 1 is a partial, perspective view, partly broken away showing the pipe joint of the invention in which a male spigot pipe end is inserted within a female socket end, the female socket end having a groove for receiving the sealing gasket of the invention.

FIG. 2 shows an elastomeric sealing gasket 11 having a steel reinforcing ring 13 in place on the generally cylindrical outer working surface 15 of the mandrel 17 used in the belling process. The elastomeric gasket 11 can be formed of, for example, rubber and is a ring shaped, circumferential member having a lower compression region 19 and an exposed nose portion 21 which, as shown in FIG. 1, abuts a back-up or forming collar 23. The forming collar 23 has a first generally cylindrical extent 25 which is joined to a second cylindrical extent 27 by a step region 29, whereby the second extent 27 is of greater external diameter than the first cylindrical extent 25, as shown in FIG. 2.

In the prior art technique, the steel reinforced elastomeric ring 11 is placed onto the working surface of the mandrel 17 and pushed to a position against the back-up or forming collar 23. In this position, the gasket is firmly anchored to the mandrel surface In the second step of the process, the socket end 33 of the thermoplastic pipe 31 is heated and pushed over the steel mandrel 17, gasket 11 and back-up collar 23. The socket end is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint.

The socket end 33 flows over the first cylindrical extent 25 of the back-up collar 23 and abuts the step region 29 in the second step of the process.

In the next step of the technique (FIG. 4) the mandrel and pipe move away from the back-up collar 23 and the pipe socket end 33 retracts around the mandrel and gasket 11 due to the elastic forces of the thermoplastic material. Typically, vacuum was also supplied through ports 35, 37 which connected the mandrel working surface with a vacuum source (not shown).

In the last step of the process, the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal. Because the sealing of the gasket against the socket took place under controlled conditions in the factory, there was no possibility that sand or similar contaminates would penetrate the crucial sealing zone of the gasket during storage, transportation or installation.

The above described Rieber process has been in commercial use since the early 1970's and is described in the above referenced issued United States patents, among other sources. It will thus be well familiar to those skilled in the thermoplastic pipe sealing arts.

FIG. 1 shows a sealing gasket of the invention, designated generally as 43 which is installed within a groove 45 provided within a socket end 47 of a thermoplastic pipe. The gasket 43 has the improved compression seal geometry of the invention so that insertion of the male, spigot pipe section 49 within the female, socket section 47 can be achieved with a minimum insertion force while maintaining the desired compression seal for the joint so made up. While the exploded view of the male and female pipe sections 47,49 show the male, spigot pipe section 49 having a chamfered lip or bevel 50, the improved gasket of the invention has been found to accommodate a non-chamfered spigot end.

Figure 6:
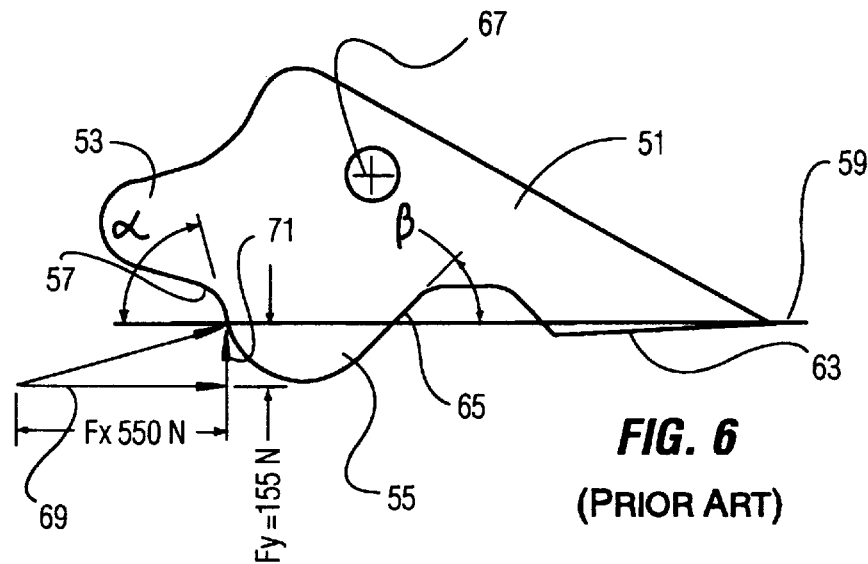
FIG. 6 a side, cross-sectional view of a prior art gasket used in the Rieber process illustrated in FIGS. 2–5.

The improved compression seal geometry of the gasket of the invention can best be appreciated with respect to the prior art seal shown in FIG. 6 of the drawings. The prior art seal 51 is a ring shaped elastomeric body which, when viewed in cross-section, includes a leading nose region 53 and a lower compression region 55. The leading nose region 53 is joined to the lower compression region 55 by a leading curved surface region 57 which defines an angle $\alpha$ with respect to a horizontal axis 59 drawn parallel to a central axis 61 (FIG. 1) of the female or socket end of the thermoplastic pipe. In the example shown in FIG. 6, the angle $\alpha$ is approximately 75° with respect to the horizontal axis 59.

The lower compression region 55 is also joined to a secondary seal surface 63 by a trailing curved surface region 65 which defines a second angle $\beta$ with respect to the horizontal axis 59 drawn parallel to the central axis 61 of the pipe. The angle $\beta$, in this case, is approximately 45°. The sealing gasket 51, in this case, also includes a metal reinforcing element, such as steel ring 67 which runs through the interior of the gasket about the diameter thereof.

Referring to FIG. 1, the make-up of the pipe joint requires the insertion of the male spigot pipe section 49 within the mouth opening of the female socket end 47. As the male spigot end 49 passes over the gasket region, the compression region 55 of the sealing gasket 51 is compressed to approximately the horizontal axis 59 shown in FIG. 6. Resolving the necessary insertion force required for the male spigot pipe section 49 to pass over the sealing gasket 51 into its component vectors, the leading curved surface region 57 of the prior art gasket requires an x component force 69 of approximately 550 Newton and a y component force of approximately 155 Newton.

Figure 7:
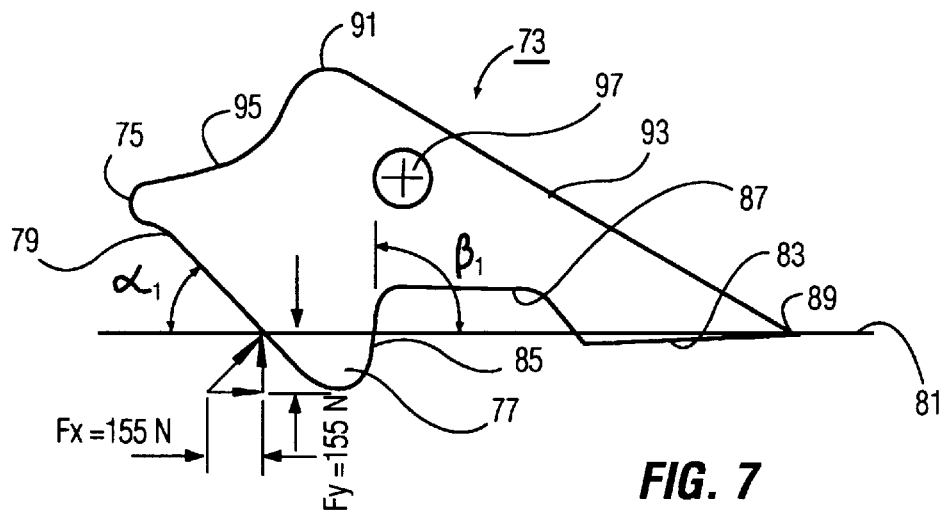
FIGS. 7 and 8 are side, cross-sectional views of the sealing gasket of the invention having an improved low insertion geometry.

Turning to FIG. 7, there is shown a pipe sealing gasket of the invention designated generally as 73. The gasket 73, again includes a nose region 75 which is joined to a lower compression region 77 by a leading curved surface region 79 which defines an angle $\alpha_1$ with respect to the horizontal axis 81 drawn parallel to a central axis 61 of the pipe. The lower compression region 77 is joined to a secondary seal surface 83 by a trailing curved surface region 85 and an intermediate circumferential groove region 87. The trailing curved surface region 85 defines a second angle $\beta_1$ with respect to the horizontal axis 81 drawn parallel to the central axis 61 of the pipe.

The secondary seal surface 83 is a planar circumferential region which terminates in an inside corner 89 of the gasket 73. The inside corner is connected to an outer arcuate region 91 of the gasket 73 by a uniformly sloping exterior gasket surface 93. The outer arcuate region 91 is connected to the nose region 75 of the gasket by a concave curved region 95. The gasket 93 may also be provided with a reinforcing element such as the metal ring 97.

In the case of the improved sealing gasket 73 of the invention, the angles $\alpha_1$ and $\beta_1$ are selected to minimize the insertion force required when inserting a male spigot end 49 within the female socket end 47 while maintaining a compression seal between the pipe sections. Preferably, the angle $\alpha_1$ is selected to be less than or equal to about 60° while the angle $\beta_1$ is selected to be greater than or equal to about 45° with respect to the horizontal axis 81 drawn parallel to the central axis 61 of the pipe. Most preferably, the angle $\alpha$ is selected to be about 45° or less while the angle $\beta_1$ is selected to be approximately 90°.

In the example of FIG. 7, where the angle $\alpha_1$ is approximately 45° and the angle $\beta_1$ is approximately 90°, the insertion force components are resolved into x and y component vectors which, in this case, produce an x component of 155 Newton and a y component of 155 Newton. Thus, by modifying the angles $\alpha$ and $\beta$, the overall insertion force is lessened ($F_x$ of 155 N versus $F_x$ of 550 N).

Figure 8:
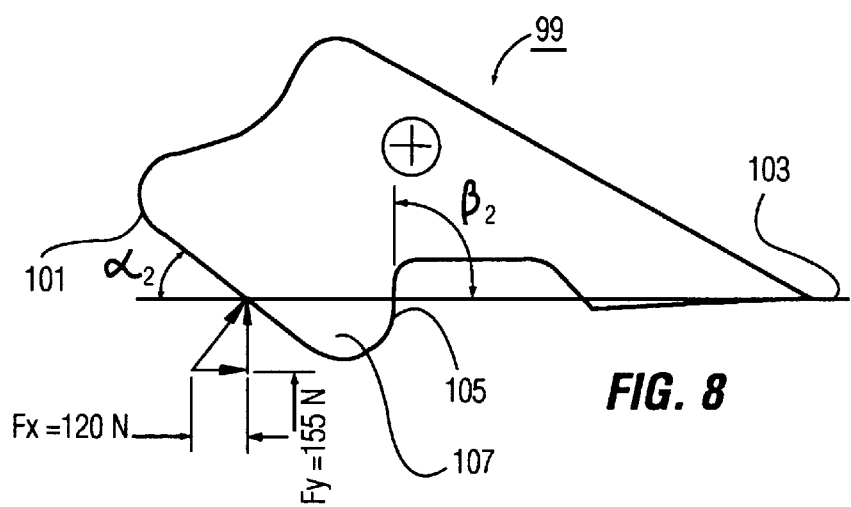

FIG. 8 shows another embodiment of the invention also having the improved seal geometry. In this case, the sealing gasket 99 has a leading curved surface region 101 which forms an angle $\alpha_2$ of approximately 37° 15 minutes with respect to the horizontal axis 103 drawn parallel to the pipe central axis 61. The trailing curved surface 105 defines an angle $\beta_2$ with respect to the horizontal axis 103 which is approximately 90° perpendicular. In this case, the force components of the male spigot end resolve into an x component of 120 Newton and a y component of 155 Newton. Once again, the x component of the insertion force is reduced.

By decreasing the angle $\alpha$ presented by the leading curved surface region 101 to the horizontal axis 103, the required insertion force of the male spigot end within the female pipe socket can be reduced. However, there is a compromise between the desired insertion force and the compression force provided by gasket in the joint assembled condition. If the required insertion force were continually decreased by lowering the insertion angle, eventually no compression seal would be available to maintain the integrity of the joint under field conditions. In practice, Applicant has found that the angle $\alpha$ for the leading curved surface region 101 should be less than or equal to about 60° and greater than or equal to about 15° with respect to the horizontal axis 103, most preferably about 45° with respect to the horizontal axis 81.

The angle $\beta$ defined by the trailing curved surface 105 is preferably sufficient to provide some simulated "lip" condition to the seal to allow the lower compression region 107 to deform inwardly to some extent while still providing a compression seal. Preferably, the angle $\beta$ defined by the trailing curve surface 105 is greater than or equal to about 45° and less than or equal to about 100°, most preferably about 90° with respect to the horizontal axis 103.

The previously described angles provide a gasket with an improved insertion geometry. The gasket has the same sealing area in contact with the male spigot as the prior art gasket, yet with approximately 50% of the required insertion force in the preferred example. While the insertion force (x component) was reduced from 550 Newton to 155 Newton between FIGS. 6 and 7, the compressive component of force (y component) remains unchanged at 155 Newton.

Thus, in the examples given, the insertion force required to insert the male spigot end within the female socket end to make up a pipe joint can be resolved into an x-component of force and a y-component of force. The angles $\alpha$ and $\beta$ are selected to decrease the x-component of force without appreciably altering the y-component of force when inserting the male spigot end within the female socket end. By "appreciably altering" is meant that the x-component of force is preferably decreased by 40% or more, most preferably about 50%, while the y-component of force is decreased less than about 5–10% and most preferably remains unchanged.

Figure 9:
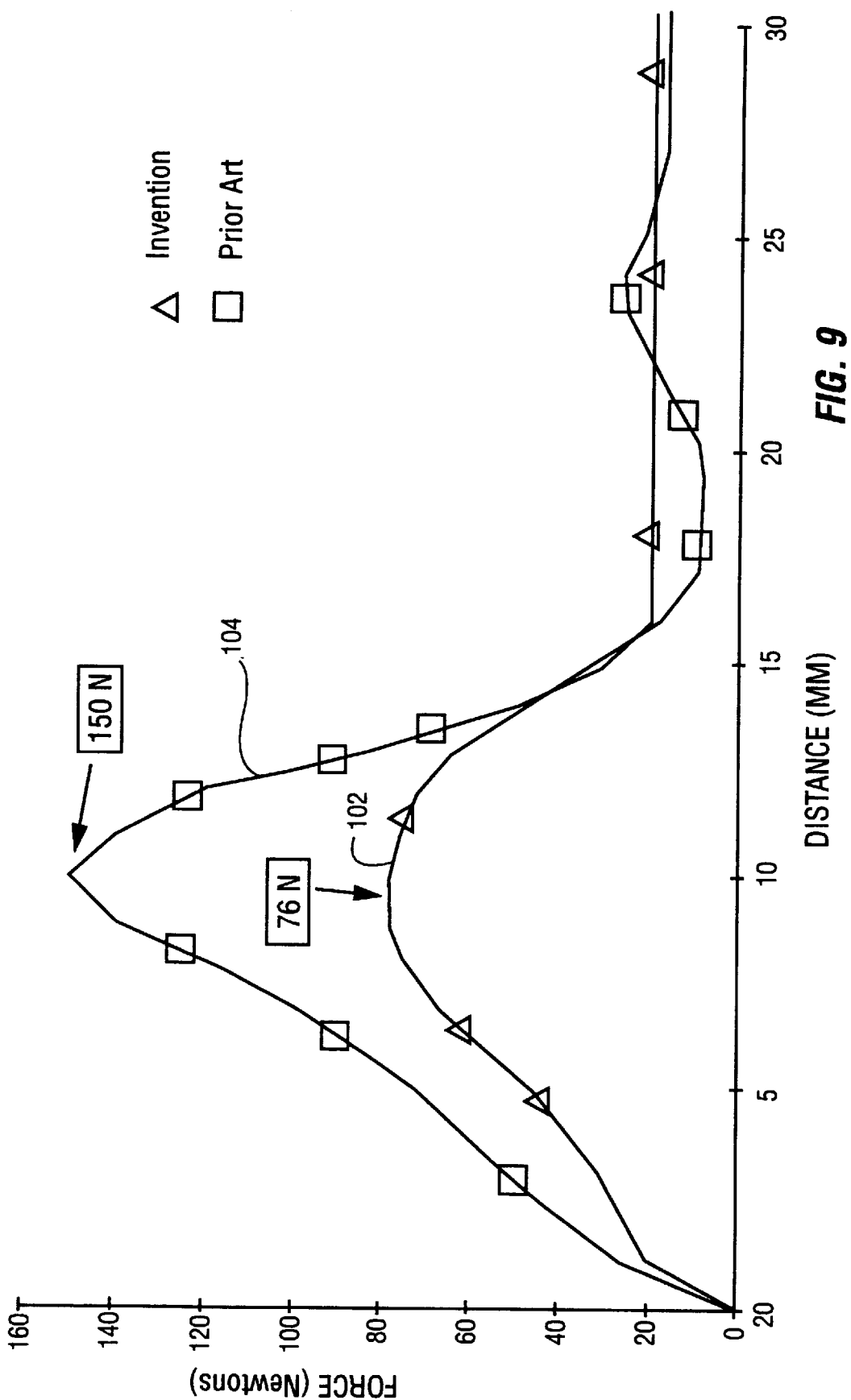
FIG. 9 is a graph of insertion force versus distance of travel for a chamfered pipe joint comparing the gasket of the invention with a prior art gasket.

FIG. 9 is a graph of insertion force versus distance of travel of the male, spigot pipe end within the female, socket end for a gasket of the invention 102 as compared to a prior art gasket 104. In this case, the gasket 102 has a chamfered male spigot. The insertion force of the prior art gasket was 150 Newton as compared to 76 Newton for the gasket of the invention. The insertion force is lower and more uniform for the gasket 102 of the invention.

Figure 10:
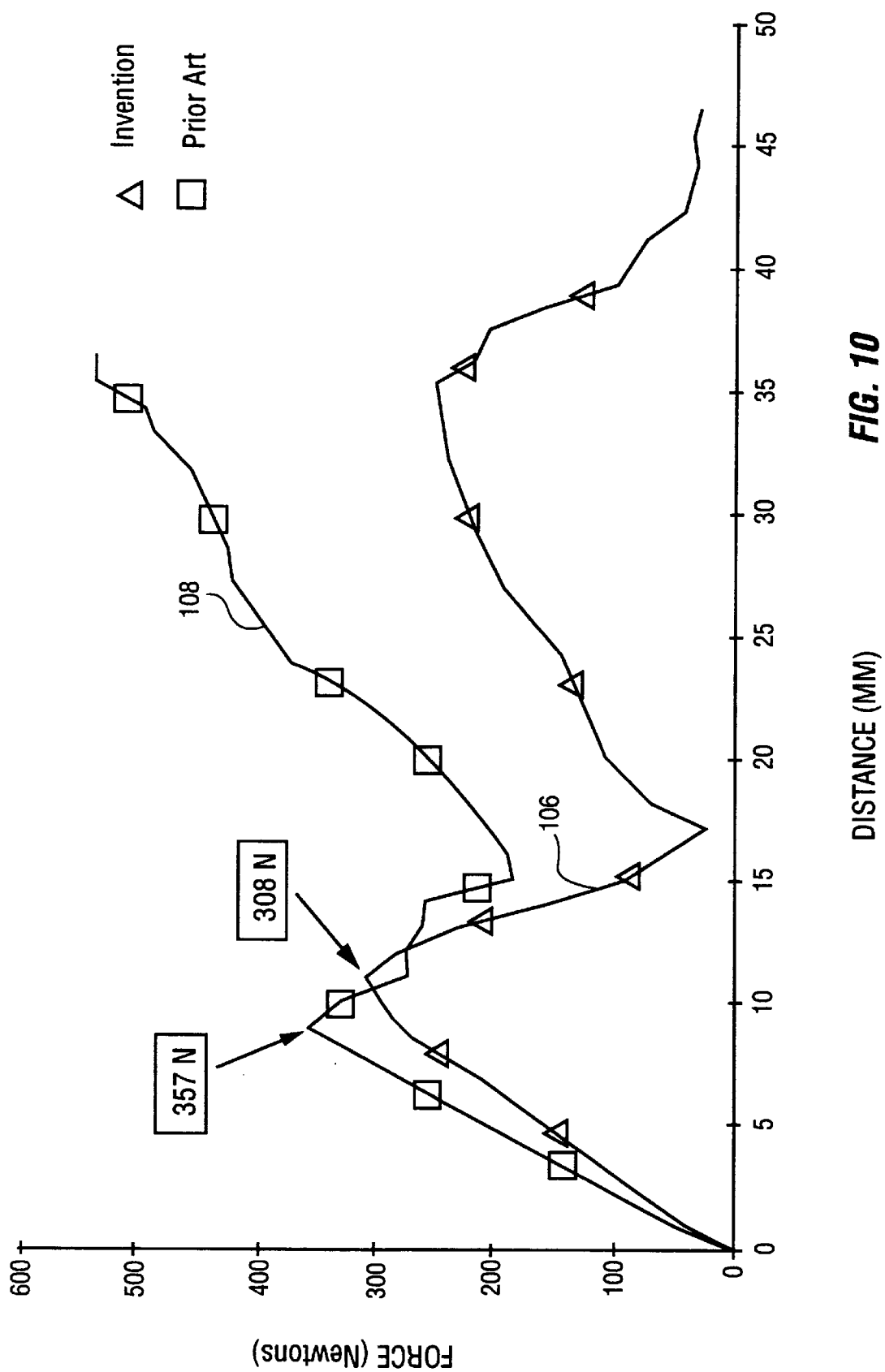
FIG. 10 s a graph similar to FIG. 9 but showing insertion for e versus distance of travel for a non-chamfered pipe joint comparing the gasket of the invention with a prior art gasket.

FIG. 10 is a graph of insertion force versus distance of travel of the male, spigot pipe end within the female, socket end, but in this case, the male spigot is non-chamfered. Curve 106 shows the insertion force for the gasket of the invention while curve 108 shows the prior art gasket. Again, the insertion force encountered in making up the pipe joint is lower and more uniform in the case of the gasket 106 of the invention. In fact, the insertion force for the prior art gasket 108 goes off the graph in the case of the non-chamfered male spigot. In other words, the male spigot either displaces the gasket or tends to shear the gasket.

An invention has been provided with several advantages. The sealing system of the invention provides an integrally formed sealing gasket within a groove provided within a socket end of a thermoplastic pipe which features an improved low insertion geometry. The gasket design of the invention provides the advantages of a compression seal while reducing the required insertion force of the male spigot pipe end of the pipe. The reduced insertion force required helps to ensure that the sealing gasket remains in place without being dislodged or deformed during pipe joint make-up. Because a compression seal is employed, the disadvantages of a lip seal are avoided, such as the seal peeling away under certain conditions or being less than effective under pulsating pressure conditions.

The improved sealing gasket of the invention employs basically the same amount of rubber as the prior art gasket design, thus allowing for an adequate compression seal while reducing the required insertion force of the male spigot pipe end within the mating female socket end of the pipe. As a result, joint integrity is preserved while reducing the required insertion force, thereby facilitating assembly of the joint in the field. Unlike the prior art lip seals, the sealing system of the invention will accept a deflection load. The sealing system will also accommodate a non-chamfered male spigot without displacing the gasket or shearing the gasket during assembly.

The changes to the sealing gasket geometry do not require dramatic changes in the required tooling, allowing the gasket to be modified simply and economically while achieving substantially improved field performance.

While the invention has been shown in only one of its forms, it is not thus limited but is susceptible to various changes and modifications without departing from the spirit thereof.

What is claimed is:

1. A pipe sealing gasket designed for receipt within a groove provided within a socket end of a thermoplastic pipe, the gasket having an improved low insertion geometry, the gasket comprising:

a ring shaped elastomeric body which, when viewed in cross section, includes a leading nose region and a lower compression region, the leading nose region being joined to the lower compression region by a leading curved surface region which defines an angle α with respect to a horizontal axis drawn parallel to a central axis of the pipe, the lower compression region being joined to a secondary seal surface by a trailing curved surface region which defines a second angle β with respect to the horizontal axis drawn parallel to the central axis of the pipe;

wherein the angles α and β are selected to minimize the insertion force required when inserting the male spigot end within the female socket end while maintaining a compression seal between the pipe sections;

wherein the angle α is selected to be less than about 60 degrees and the angle β is selected to be greater than about 45 degrees; and wherein the insertion force required to insert the male spigot end within the female socket end to make up a pipe joint can be resolved into an x-component of force and a y-component of force and wherein the angles α and β are selected to decrease the x-component of force without appreciably altering the y-component of force when inserting the male spigot end within the female socket end, the x-component of force being decreased by at least 40% while the y-component of force is decreased by less than 10%.

2. The pipe sealing gasket of claim 1, wherein the angle α is selected to be about 45 degrees or less.

3. The pipe sealing gasket of claim 1, wherein the angle β is selected to be approximately 90 degrees.

4. A pipe sealing gasket designed for receipt within a groove provided within a socket end of a thermoplastic pipe, the gasket having an improved insertion geometry, the gasket comprising:

a ring shaped elastomeric body which, when viewed in cross section, includes a leading nose region joined to a lower compression region by a leading curved surface region which defines an angle α with respect to a horizontal axis drawn parallel to a central axis of the pipe;

wherein the lower compression region is joined to a secondary seal surface by a trailing curved surface region and an intermediate circumferential groove region, the trailing curved surface region defining a second angle β with respect to the horizontal axis drawn parallel to the central axis of the pipe;

wherein the secondary seal surface is a planar circumferential region which terminates in an inside corner of the gasket, the inside corner being connected to an outer arcuate region of the gasket by a uniformly sloping exterior gasket surface, the outer arcuate region being connected to the nose region of the gasket by a concave curved region;

wherein the angle α is selected to be less than or equal to about 60 degrees and greater than or equal to about 15 degrees and the angle β is selected to be greater than or equal to about 45 degrees and less than or equal to about 100 degrees; and wherein the insertion force required to insert the male spigot end within the female socket end to make up a pipe joint can be resolved into an x-component of force and a y-component of force and wherein the angles α and β are selected to decrease the x-component of force without appreciably altering the y-component of force when inserting the male spigot end within the female socket end, the x-component of force being decreased by at least 40% while the y-component of force is decreased by less than 10%.

5. The pipe sealing gasket of claim 4, wherein the angle α is selected to be about 45 degrees or less.

6. The pipe sealing gasket of claim 4, wherein the angle β is selected to be approximately 90 degrees.

7. The pipe sealing gasket of claim 4, wherein the gasket further includes a ring shaped metal reinforcing element which is embedded within the ring shaped elastomeric body and runs about the elastomeric body at one circumferential location.

8. A method of forming a thermoplastic pipe joint using a pipe sealing gasket designed for receipt within a groove provided within a female socket end of a first section of pipe for forming a seal between an internal surface of the female socket end and a male spigot end of a mating second pipe section as a given insertion force is used to insert the male spigot end within the female socket end, the gasket having an improved low insertion geometry, the method comprising the steps of:

installing a sealing gasket within the groove provided within the female socket end of the first pipe section, the sealing gasket being formed as a ring shaped elastomeric body which, when viewed in cross section, includes a leading nose region and a lower compression region, the leading nose region being joined to the lower compression region by a leading curved surface region which defines an angle α with respect to a horizontal axis drawn parallel to a central axis of the pipe, the lower compression region being joined to a secondary seal surface by a trailing curved surface region which defines a second angle β with respect to the horizontal axis drawn parallel to the central axis of the pipe;

wherein the angles α and β are selected to minimize the insertion force required when inserting the male spigot end within the female socket end while guiding the spigot end and maintaining a compression seal between the pipe sections; and wherein the insertion force required to insert the male spigot end within the female socket end to make up a pipe joint can be resolved into an x-component of force and a y-component of force and wherein the angles α and β are selected to decrease the x-component of force without appreciably altering the y-component of force when inserting the male spigot end within the female socket end, the x-component of force being decreased by at least 40% while the y-component of force is decreased by less than 10%.

9. The method of claim 8, wherein the angle α is selected to be less than or equal to about 60 degrees and greater than or equal to about 15 degrees and the angle β is selected to be greater than or equal to about 45 degrees and less than or equal to about 100 degrees.

10. The method of claim 8, wherein the angle α is selected to be about 45 degrees or less.

11. The method of claim 8, wherein the angle β is selected to be approximately 90 degrees.

12. The method of claim 8, wherein the gasket has a ring shaped metal reinforcing element which is embedded within the ring shaped elastomeric body and runs about the elastomeric body at one circumferential location.

* * * * *